UNITED STATES PATENT OFFICE.

ALEXIS P. ZARIN, OF MOSCOW, RUSSIA.

IMPROVEMENT IN PROCESSES OF MAKING BREAD.

Specification forming part of Letters Patent No. 176,502, dated April 25, 1876; application filed January 5, 1876.

*To all whom it may concern:*

Be it known that I, ALEXIS PETROVITSCH ZARIN, of the city of Moscow, in the Empire of Russia, have invented a new and useful Process for Manufacturing Bread, which process is fully set forth in the following specification:

This invention relates to that class of processes employed for baking different kinds of bread directly from grain, without converting the same into flour; and it consists in preparing the dough from washed, soaked, and bruised grain.

In carrying out my invention, the grain destined for baking is first washed with water, in order to remove all dust, dirt, and unsound grains. By washing may be removed even the *Secale cornutum*, which is not arrived at by any sorting.

The washed grain is placed in tubs, where the same is soaked with water having a temperature of about sixty-four (64) to seventy-one (71) degrees Fahrenheit, until it becomes sufficiently soft to undergo the next operation of bruising, which ordinarily takes place at the expiration of twenty (20) to twenty-four (24) hours. The bruising of the soaked grain can be performed by any corn-bruiser, as, for instance, by one used in distilleries for bruising green malt.

The mass obtained after bruising the soaked grain serves immediately for making dough of it. For this purpose two-thirds ($\frac{2}{3}$) of the whole of the bruised mass are taken off and carefully mixed at a temperature of about seventy-one (71) degrees Fahrenheit in the water having served for soaking the grain, at the same time adding, for fermenting, to this water leaven in quantity equal to fifteen (15) per cent. of the weight of dry grain taken. Having thus prepared the sponge of dough, the remaining one-third ($\frac{1}{3}$) of the bruised grain is thrown on the top of it for kneading, which is done only when the dough has sufficiently risen. About three hours afterward the dough is kneaded again, and is then ready for putting in the oven and baking in the usual manner. For rolling the dough, may be employed either the same mass of bruised grain, having left for this purpose one-tenth ($\frac{1}{10}$) part of the whole quantity, or bran, (the husks remaining after stripping the grain.)

In the foregoing is described my method of baking bread directly from grain, whereby, before soaking, it is not stripped, *i. e.*, not separated from the husks, containing a nutritious substance called "cerealine" or "maltine." Such bread is of a light chocolate color, lighter than the color of bread baked from flour, and is preferable even to bolted-flour bread in all cases where the same is to be the almost unique food, because the nourishing qualities of my bread are considerably surpassing all more refined kinds of bread.

Above I mentioned that, for preparing what is called the "sponge of dough," the bruised mass of grain is carefully mixed in the water having served for soaking the grain. This is done for the sake of utilizing the nutritious matters, azotic and phosphorous, that may have been dissolved in the water while soaking the grain. This water may therefore be called extract-water.

If, before soaking, the grain is freed from husks, and the other operations performed as aforesaid, rye will give fine rye-bread, while wheat will give all kinds of white bread, the whiteness and purity whereof will be entirely depending upon how the grain has been stripped, *i. e.*, on the number of husks taken off. By taking from wheat the husk No. 6, the cerealine is also removed, so that white bread of the highest quality is obtained.

For making "sweet-sour" bread, much used in Russia, the water having served for soaking the grain, extract-water, before being used for making dough, is first heated to a temperature of about one hundred and thirty-four (134) degrees Fahrenheit. By employing, instead of leaven, for fermenting the dough, yeast, carbonic gas, Horsford's powder, &c., in the usual proportions, unleavened bread is obtained.

The superiority of my method of baking bread directly from grain without grinding it into flour is self-evident, and consists principally in obtaining bread free of all impurity, or even injurious admixtures, met with in flour brought to market, and likewise in the considerable cheapness of same. Independently of economizing the expenses for converting grain into flour, of the circumstance that keeping and transporting grain is simpler, easier, and cheaper than keeping and transporting flour, and that abuses are by far not so easily committed in selling grain as in the sale of flour, in consequence whereof, in buying grain, there is a greater chance of avoiding being deceived, and the bread produced of a better quality, my method of baking bread directly from grain gives greater weight. Experiments have proved that, for each hundred-weight of rye, thrashed in dry weather, baked by my method, nearly one hundred-weight of additional weight is obtained, and for each hundred-weight of wheat more than three-quarters of a hundred-weight, while in employing flour the additional weight obtained from rye-flour is about half a hundred-weight, and from wheaten flour only one-quarter of a hundred-weight, or so. This is caused by the circumstance that flour, thrown in water, falling down in lumps, forms clods; thus part of it is not mixed with water and forms no dough, which cannot be the case in baking bread directly from grain. Besides, the dry flour remaining in the ready-baked flour-bread begins afterward to attract moisture out of the surrounding baked dough, thus forming raw paste, in consequence whereof the bread soon becomes stale, moldy, and putrefies. Bread baked after my method will neither spoil nor get stale for more than a fortnight.

I claim as my invention—

1. The process herein described of preparing dough for bread—that is to say, first soaking in water unstripped grain, retaining its nutritious qualities, and then bruising the soaked grain, substantially as described.

2. The within-described mode of making bread—that is to say, first soaking stripped or unstripped grain in water, and bruising the soaked grain, then mixing part of this bruised mass with leaven and the water used for soaking, and kneading this with the remainder of the bruised grain into baking-dough, all substantially as set forth.

3. As a new article of manufacture, bread baked from dough which has been prepared from a mass of bruised unstripped grain, previously soaked in water, as specified.

In testimony whereof I have signed my name to this specification in the presence of two subscribing witnesses.

ALEXIS PETROVITSCH ZARIN.

Witnesses:
 N. TSHEKALOFF,
 C. L. F. VOSS.